United States Patent [19]

Decraemer

[11] Patent Number: 4,788,591
[45] Date of Patent: Nov. 29, 1988

[54] SWITCHED-MODE POWER SUPPLY FOR A TELEVISION RECEIVER PROVIDED WITH A STAND-BY SYSTEM

[75] Inventor: Alain Decraemer, Garches, France
[73] Assignee: U. S. Philips Corporation, New York, N.Y.
[21] Appl. No.: 127,824
[22] Filed: Dec. 1, 1987
[30] Foreign Application Priority Data
  Dec. 5, 1986 [FR] France ................. 86 17070
[51] Int. Cl.⁴ .............................................. H04N 3/18
[52] U.S. Cl. .................. 358/190; 358/194.1; 315/411
[58] Field of Search ............ 358/190, 194.1; 315/408, 411; 363/21, 18

[56] References Cited

U.S. PATENT DOCUMENTS

| | | | |
|---|---|---|---|
| 3,956,669 | 5/1976 | Del Ciello | 358/190 |
| 4,486,822 | 12/1984 | Marinus | 358/190 |
| 4,500,923 | 2/1985 | Duvall et al. | 358/190 |
| 4,532,457 | 7/1985 | Hafere | 358/190 |
| 4,631,654 | 12/1986 | Houee et al. | 358/194.1 |
| 4,641,064 | 2/1987 | Testin et al. | 358/190 |
| 4,651,214 | 3/1987 | Rodriguez-Cavazos | 358/190 |
| 4,656,399 | 4/1987 | Testin et al. | 315/411 |
| 4,692,852 | 9/1987 | Hoover | 358/190 |
| 4,734,771 | 3/1988 | Lendaro et al. | 315/411 |
| 4,737,851 | 4/1988 | Shanley, II et al. | 315/411 |

Primary Examiner—James J. Groody
Assistant Examiner—John K. Peng
Attorney, Agent, or Firm—Thomas A. Briody; Algy Tamoshunas; Marianne R. Rich

[57] ABSTRACT

Television receiver including a switched-mode power supply which is regulated and capable of functioning both in self-oscillating mode and under the control of a line frequency synchronization. During normal operation there is synchronization, and the line time base supplies most of the supply voltages to the circuits of the receiver. To change to the stand-by state the drive of the line transistor is stopped, which stops most of the circuits depending thereon. The switched-mode power supply continues to function but then in the self-oscillating mode, and supplies the stand-by device via a secondary winding of its storage inductor.

8 Claims, 2 Drawing Sheets

SWITCHED-MODE POWER SUPPLY FOR A TELEVISION RECEIVER PROVIDED WITH A STAND-BY SYSTEM

The invention relates to a television receiver having a stand-by device, comprising a switched-mode power supply with a storage inductor and a switching device for supplying user circuits, a power stage for the line deflection having a switching element and a transformer which is supplied by the switched-mode power supply, whilst other user circuits are supplied via secondary windings of the line transformer, the stand-by stage being obtained by stopping the line deflection.

A receiver as described above is known from the document PCT WO No. 86/05345. The device described in that document includes a separate transformer whose primary winding is connected to mains, to supply the stand-by device. This stand-by device is constituted by a processor which, when it is energized, applies the supply power from the above transformer to a line oscillator and to a line deflection driving stage. Thus, from the start a line synchronizing signal is available on this line deflection driver. Making it operative produces on the secondary windings of the line transformer the majority of the voltages necessary for the functioning of the circuits of the television receiver. This lay-out of the circuit has the drawback that it requires the use of a mains transformer whose windings are provided on sheet-metal cores, which is always more expensive than a transformer for a switched-mode power supply.

The invention has for its object to provide a solution for adjusting the receiver to the stand-by state and for insulating the circuit of the television receiver from mains, which solution is particularly economical and in which no mains voltage transformer is used.

To that end, the receiver according to the invention, is characterized in that the stand-by device is also supplied by the switched-mode power supply, the latter including self-oscillating and regulating means to ensure that when the line deflection is stopped the switched-mode power supply continues to supply the same voltage to the stand-by device.

However, the simultaneous supply of the stand-by device and the line deflection causes a problem as the supply voltage of the stand-by device is very much lower than the supply voltage of the line deflection circuit. To solve this problem, the storage inductor of the switchedmode power supply is advantageously provided with at least one secondary winding for supplying the stand-by device.

To allow an immediate synchronization of the line oscillator from the starting phase the line oscillator is advantageously also supplied from a secondary winding of the storage inductor.

The self-oscillating and regulating means of the switched-mode power supply are realized in a particularly simple and economical manner when the control of the switching device and the voltage regulation provided by the switched-mode power supply are together ensured by a comparator device which drives the control circuit of the switching device such that it triggers its conduction when said voltage is less than a reference value and stops conduction in the opposite case. Using this device, the supply oscillates freely at an indeterminate frequence. To prevent any interferences which might cause streaks or moire effects on the picture, it is advantageous for the television receiver to be provided with means to ensure that the switched-mode power supply changes from the self-oscillating mode to a mode in which it is synchronized mode by the line deflection when it is no longer in the stand-by state.

In quality receivers, in which the audio stage is comparatively powerful, it is advantageous that it is also supplied by a secondary winding of the storage inductor. This renders it possible to avoid interaction between the sound and the picture.

The following description which is given by way of non-limitative examples with reference to the accompanying drawings will make it better understood how the invention can be put into effect.

The basic principle of the power supply consists in first rectifying the mains voltage without the use of a transformer, to regulate the d.c. voltage obtained with the aid of a switched-mode device which supplies the line power stage from which most of the voltages for further user circuits are obtained by means of secondary windings of a line transformer. Although the latter supplies the majority of the voltages necessary in the television receiver, it does not produce the supply voltage for the stand-by device. The stand-by device which comprises circuits for receiving the remote control signal and to at least ensure stopping and starting the television receiver (the change from the stand-by state to normal operation and vice versa) is directly supplied by the switched-mode power supply, as is also the line power stage. Thus, the stand-by state is obtained by having the switchedmode power supply continue operation whereas the line deflection is stopped.

Figure 1:
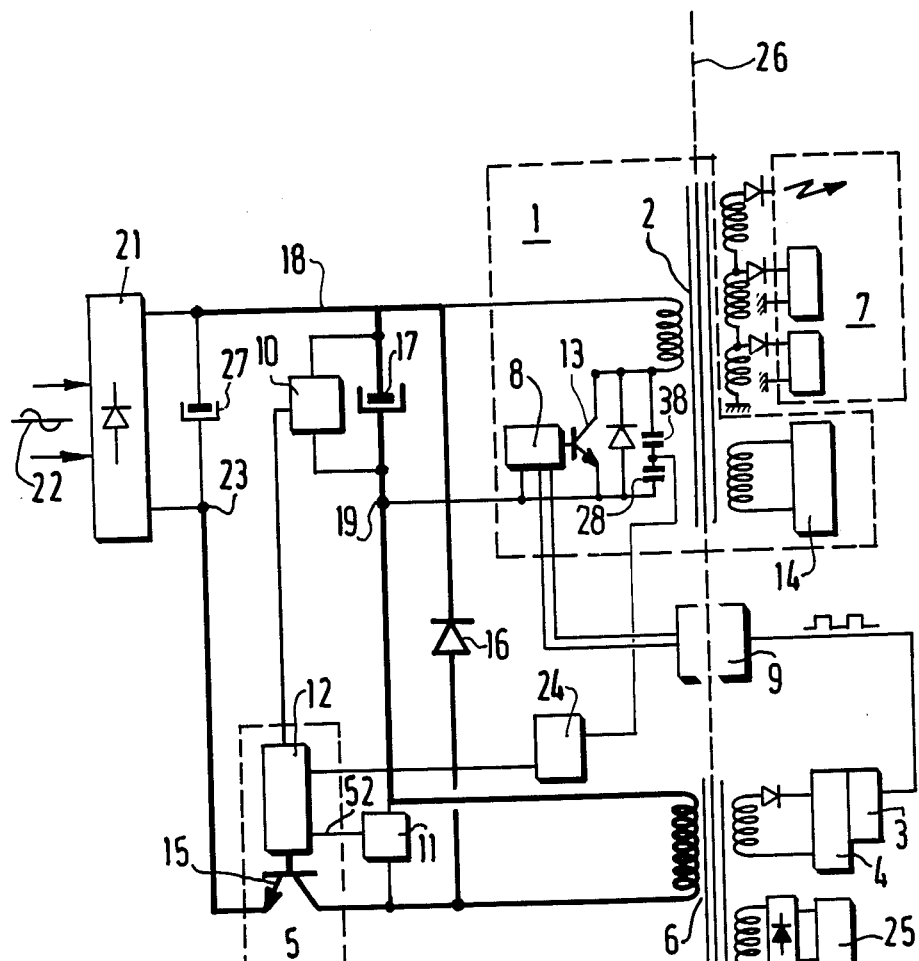
FIG. 1 is a schematic view of the devices of the invention as a part of a television receiver.

In FIG. 1 the mains voltage 22 having a value of 227 volts is directly rectified by a rectifier device 21 which applies to the terminals 18, 23 of a capacitor 27 a d.c. voltage of approximately 300 volts. The wiring indicated by a thick line corresponds to the essential part of the switched-mode power supply. Arranged in series from terminal 18 to terminal 23 are a storage capacitor 17 at whose terminals 18, 19 the regulated voltage obtained by the switched mode is developed, a storage inductor 6 and a switching device 5. A flyback diode 16 connects the junction of inductor 6 and device 5 to terminal 18 to provide a path for the inductor current when device 5 cuts the circuit. This is all well-known in the art and does not require a more detailed description.

The line deflection power stage 1 is connected across capacitor 17. By means of secondary windings of the line transformer 2 this power stage applies user voltages to the user circuit 7.

The switched-mode power supply produces a voltage of approximately one hundred volts between the terminals 18, 19, whereas the stand-by device 4 requires a supply voltage of approximately 5 volts. Consequently the latter is not supplied in parallel with the line stage but by means of a voltage which is taken from inductor 6 via a secondary winding thereof. This winding is of small bulk and does not lead to an increase in the dimensions of the core of the inductor. The transformer obtained thus is consequently very small. It must nevertheless be insulated from the primary circuit to satisfy the standards as regards mains insulation.

The power supply is provided with independent self-oscillating and regulating means, constituted by a comparator device 10 which supplies a signal which is a function of the voltage applied to the line stage via terminals 18, 19, which signal is transferred to a control circuit 12 for device 5. These means render it possible for the switched-mode power supply to operate and to produce a regulated voltage, whether the line power stage is operative or not operative. Its mode of functioning is based on the following principle: when the television receiver is energized, the voltage supplied has zero value. Then the comparator device 10 supplies a signal which renders the switching device 5 conductive. The current in inductor 6 increases and charges capacitor 17. This charging operation proceeds rapidly as the line power stage does not yet consume current. When the desired voltage has been reached, the comparator 10 cuts off device 5. The voltage supplied then decreases at a rate which depends on the power consumption and when it has dropped to below a predetermined threshold, the device 5 is rendered conductive again, the voltage increases again and so forth. Thus, a process in which conduction and switch-off alternate is then in progress, and its frequency depends on the power consumed: when the consumed power increases, the voltage decreases more rapidly but increases more slowly thereafter: a compensation is thus provided with the effect that the switching rate does not vary too much versus the charge.

Thus, the control of the switching device and the regulation of the voltage supplied by the power supply are together ensured by a comparator 10 which drives the control circuit 12 of devices 5 such that it triggers its conduction when said voltage is less than a reference value and stops this conduction in the opposite case. This renders the use of the customary oscillator circuit for driving the switching action superfluous.

A line oscillator circuit 3 is advantageously arranged at the insulated side from the mains voltage, since it is connected to the signal stages of the television receiver, more specifically to the sync separator. It is supplied together with the stand-by device by the secondary winding of inductor 6. Thus, it is always operative, also during the stand-by state, freely oscillating when it does not receiver a synchronizing signal. When the television receiver is adjusted to the normal operating state circuit 3 immediately applies a signal of substantially the line frequency to driving circuits 8 for a line power transistor 13, via a d.c. insulating element 9. Here the two elements 3 and 4 are supplied by the same secondary winding, but they might alternatively be connected each one to a separate winding.

The line retrace tuning capacitance is formed by two series-arranged capacitors 28, 38, constituting a capacitive divider. From this divider a line retrace signal is applied to a circuit 24 which is connected to the control circuit 12 of device 5. Together with the circuit 12 this circuit 24 ensures that the switched-mode power supply changes from the self-oscillating mode to the synchronized mode for the line deflection when it is no longer in the stand-by state.

A switching element in switching device 5 is an NPN transistor 15, and with the object of reducing the increase of the voltage at the collector of transistor 15, a capacitive delay device 11 is provided, which is connected to the terminals of inductor 6. Device 11 comprises a system of diodes for rectifying a voltage applied as a supply voltage to the control circuit 12 of device 5 via a connection 52.

Reference numeral 25 denotes an audio power stage which is also supplied by a secondary winding of inductor 6. It is possible to take approximately one third of the power dissipated in the television receiver (which corresponds to the current recovery by diode 16) from these windings. Thus, this power is sufficient for quality audio stages. This manner of producing the audio power prevents any interference between sound and picture. Moreover, the audio modulation is transmitted by a preamplifier stage which is supplied via the line transformer. Thus, on adjusting the receiver to the stand-by state, there is no modulation and the audio power stage consumes only a very low quiescent current (this stage is a pushpull class B amplifier stage).

Reference numeral 26 denotes an immaterial separating line between the circuits which are d.c. connected to the mains and the circuits insulated therefrom. Thus, only the power supply and the line power stage are connected to mains. All the other circuits and more specifically the line oscillator, the stand-by device, all the audio circuits, the video stages, the tuner which possibly might be connected to the exterior via terminals which are accessible to the user are insulated from mains. The line transformer must satisfy mains insulating standards between its primary windings and its secondary windings.

Figure 2:
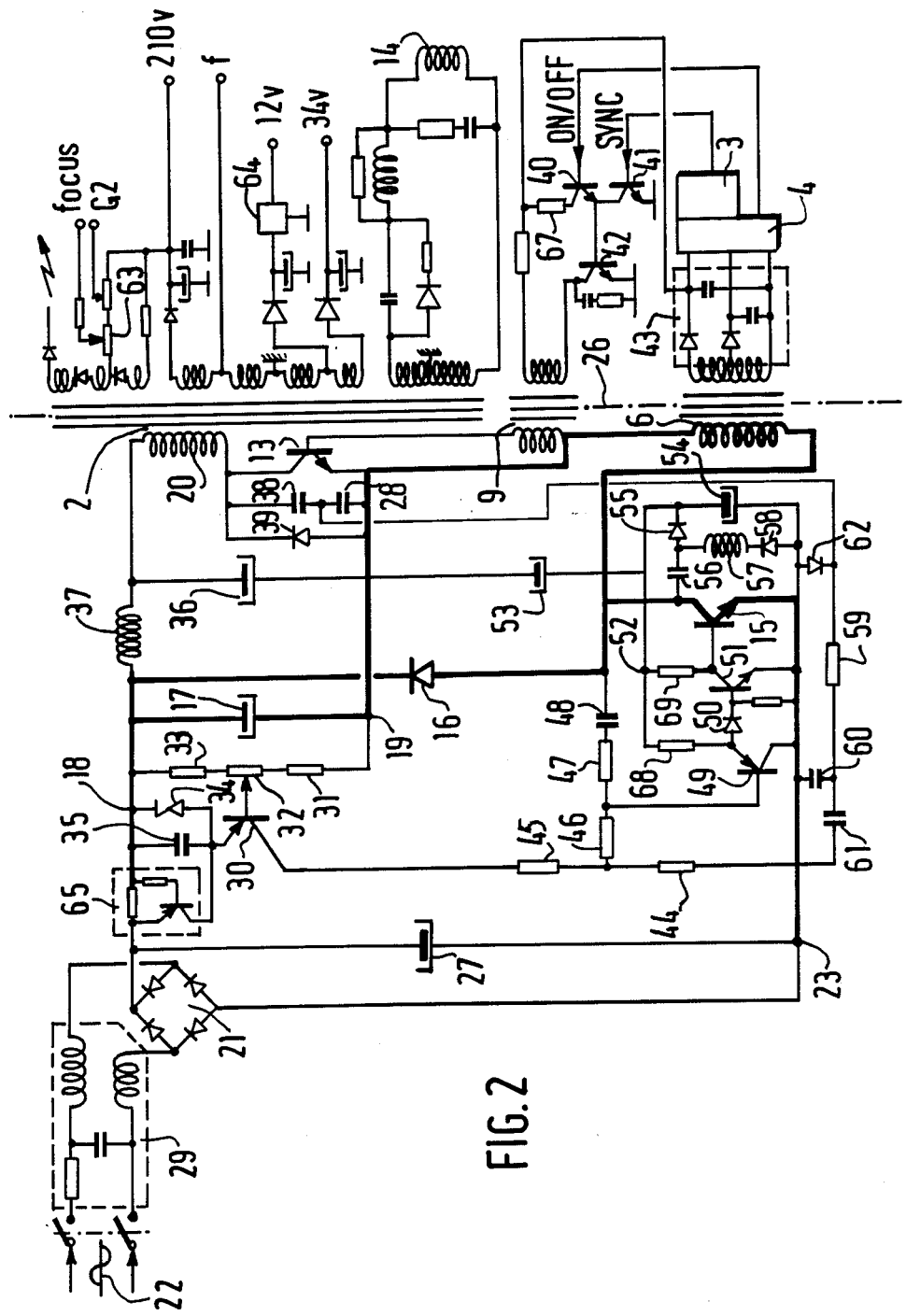
FIG. 2 is a detailed circuit diagram of an embodiment according to the invention.

In FIG. 2 all the components corresponding to those of FIG. 1 are given the same reference numerals. The connection illustrated by a thick line corresponds to the similar connection in FIG. 1. The mains voltage 22 is connected to the rectifier bridge 21 via a known filtering and protection device 29 which does not form part of the invention. The rectified current available across capacitor 27 passes through a current limiting circuit 35 of a conventional design. In the event of too high a current, this circuit connects the emitter of a PNP transistor 30 to terminal 18, which reduces to zero the supply voltage reference 34 for the regulating of the power supply voltage which then drops in response to the regulation. This circuit is useful during switching-on to limit the charging current of capacitor 17 and obviously also in the case of malfunctioning of the load or other user circuits.

The comparator 10 of FIG. 1 is here represented by the components 30 to 35. A divider arranged between terminals 18, 19 and formed by two series-arranged resistors 31, 33 with interposed potentiometer 32 passes a fraction of the supplied voltage to the base of transistor 30. On the other hand the emitter of this transistor 30 is connected to terminal 18 via a zener diode 34 which thus constitutes the supply voltage reference referred to above. If the supplied voltage exceeds a predetermined value transistor 30 becomes conductive.

A capacitor 35 across zener diode 34 has for its result that on switching-on the supply voltage reference has first zero value and thereafter increases at a rate which can be modified by the choice of the value of the capacitor. Thus, on switch-on, the increase in the supply voltage is slowed down.

Control circuit 12 of FIG. 1 is here represented by the components 45 to 51. The collector current of transistor 30 is passed to the base of a PNP transistor 49 via series-arranged resistors 45 and 46. Transistor 49 is arranged as an emitter follower between a supply terminal 52 and the most negative terminal 23. Its emitter is connected via a voltage-shifting diode 50 to the base of an NPN transistor 51 which is connected as a common emitter amplifier between the same terminals as transistor 49. Finally, the collector of this transistor 41 is connected to the base of the power transistor switch 15. The two transistors 49 and 51 are necessary to apply an adequate base current to the transistor 15. Moreover, they invert the drive current since the current coming from the collector of transistor 30 does not flow in the appropriate direction for driving the base of transistor 15. Finally, a series RC circuit 48, 47, which is connected between the collector of transistor 15 and the base of transistor 49 constitute a feedback which assists in the oscillation by accelerating the transistions and thus reduces the dissipation in transistor 15.

The delay device 11 of FIG. 1 is here formed by the components 53 to 58. Two capacitors 53 and 54 which are arranged in series between terminal 19 and terminal 23 are charged at switching-on with charges which are inversely proportional to their capacitances. From the beginning this funishes a voltage across capacitor 54 which is passed to connection 52 to act as a supply voltage to control circuit 49–51 and allows saturation of transistor 15. A capacitor 56 connects the collector of this transistor to capacitor 54 via a diode 55, whose anode is connected towards transistor 15. At each increase of the voltage across the transistor, the charging rate of this capacitor 56 determines the rate at which the collector voltage increases. Furthermore, a diode 58 whose anode is connected to terminal 23 and whose cathode is connected via an inductance 57 to the anode of diode 55 constitutes a sort of voltage doubler and renders it possible to supply an average d.c. current through diode 55. This is the current which is passed to connection 52 to feed control circuit 49–51.

When the current in diode 16 stops because inductor 6 has stopped discharging a complex system of oscillations is established between said inductor and its own parasitic capacitance on the one hand and between the inductor and capacitor 56 on the other hand, creating a sinusoidal variation which is rectified by diodes 55 and 58. All this does not disturb the overall functioning of the power supply, more especially as very quickly after the current in diode 16 has stopped, the voltage produced by the power supply decreases at the terminals of capacitor 17 which results in a new conduction phase of transistor 15, by the action of the comparator 30–34 which is associated with control circuit 44–51.

With the values of the components as specified in the list of references attached to this description, the frequency of the free oscillation is located around 30 kHz for a supplied power of 40 W. When a change over is made to the stand-by state, the power is low (approximately 10 W) and the rate at which the switched-mode power supply switches decreases until the instant at which transistor 15 only operates with bursts with a repetition rate of approximately 7 kHz. The voltages relative to the most negative terminal 23 have a value of 200 V on terminal 19 and of 300 V on terminal 18, and inductor 6 thus alternately "sees" 200 V in one direction and 100 V in the other direction.

The circuit 24 of FIG. 1 for the synchronization is here constituted by the components 59 to 62. The line retrace pulses transmitted by capacitor 28 are converted into sawtooths by an integrating circuit formed by the series arrangement of a resistor 59 and a capacitor 60 provided between the capacitor 28 and terminal 23, respectively. A diode 62 connected between terminal 23 and capacitor 28 recovers a d.c. component. From the junction of capacitor 60 and resistor 59, the sawtooth signal is transmitted via a capacitor 61 and a resistor 44 arranged in series therewith to the junction of the resistors 45, 46 mentioned in the foregoing. This sawtooth is then superposed on a variable d.c. voltage component, generated by the comparator circuit 30–34 across resistors 45, 46. This results in the base of transistor 49 being driven at the sawtooth waveform frequency with a variable form factor controlled by the comparator circuit. This is a known method, which is here used in addition to the procedure utilized by the control system of the transistor 15 in accordance with the invention, but only during the change from the stand-by state to the operative state.

The line deflection stage is constituted in a conventional manner by the switching transistor 13 arranged in parallel with a flyback diode 39 and the tuning capacitance 38, 28 which determines the line retrace pulse, this whole assembly being arranged in series with the primary winding 20 of line transformer 2 and being supplied from the terminals 18, 19 of the switched-mode power supply. An additional filter cell formed by a series inductor 37 and a parallel capacitor 36, which do not form part of the invention, is added to still further diminish the ripples of the supply voltage applied to the line deflection stage. The line deflection coil could be connected in a customary manner to the collector of the transistor 13. But it would then be necessary that mains insulation to be ensured between the line deflection coils and the field deflection coils, as the field deflection stages are part of the user circuits which are insulated from mains. For that reason, connecting the line deflection coil 14 to a secondary winding of the line transformer 2 is preferred.

At the right of the separating line 26 there are located, taken in a direction from top to bottom in FIG. 2, the secondary windings of the line transformer and rectifier diodes supplying the electrodes of the cathode ray tube of the television receiver: the extra high tension, the focussing voltage via a potentiometer 63, the grid voltage G2, thereafter the video circuit (210 V), the heater of the tube (f), thereafter the assembly of the further circuits to which the 12 V or 34 V voltages are applied.

A stabiliser circuit 64 is used for the 12 V supply, in order to further improve the degree of stabilisation it provides. Then, a winding applies voltage to the deflection coil 14 across several known correction elements, which do not form part of the invention.

At bottom of the Figure, a secondary winding of storage inductor 6 supplies via a rectifier assembly 43 the stand-by device 4, the line oscillator 3 and also a set of NPN transistors 40–42. The main current paths of transistors 41 and 40 are arranged in series and are connected to the assembly 43 via a resistor. Their junction is connected to the base of a transistor 42 which is connected as a common-emitter circuit and is connected to the power supply via a winding of an isolation transformer 9 whose other winding is arranged in parallel with the emitter-base diode of the line power transistor 13. Stand-by device 4 is connected to the base of the transistor 40 for the control thereof and line oscillator 3 is connected to the base of transistor 41, whose emitter is connected to ground. When the stand-by device renders the transistor 40 conductive, the transistor 41 which is charged by a resistor 67 amplifies the synchronizing signal from the line oscillator and applies it to transistor 42, which directly drives the base of transistor 13 via transformer 9. When the stand-by device renders transistor 40 non-conductive, the base of transistor 42 can no longer receive current from the power supply and this transistor is cut-off, as are also transistor 13 and the complete line deflection circuit: this is the stand-by state.

At this instant the supply continues to self-oscillate and to apply the same voltage to terminals 18, 19. Inductor 6 continues to "see" alternately 200 V in one direction and 100 V in the other direction and, consequently, its secondary winding continues to apply a voltage to rectifier circuit 43.

The circuit shown in FIG. 2 has given good results, the components which contribute to implementing the invention having the following values, for a television receiver whose power consumption during actual operation is approximately 90 W:

| Capacitors: | |
|---|---|
| 17 = 33 μF | 53 = 4.7 μF |
| 27 = 68 μF | 54 = 22 μF |
| 28 = 0.1 μF | 56 = 6.8 nF |
| 35 = 220 nF | 60 = 15 nF |
| 38 = 10 nF | 61 = 15 nF |
| 48 = 120 pF | |
| Resistors and potentiometres: | |
| 31 = 82 kΩ | 46 = 1 kΩ |
| 32 = 10 kΩ | 47 = 10 MΩ |
| 33 = 18 kΩ | 59 = 1.5 kΩ |
| 44 = 33 kΩ | 68 = 5.6 kΩ |
| 45 = 10 kΩ | 69 = 100Ω |
| Semiconductors: | |
| 15 = BUT 11 | 51 = BC548 |
| 16 = BYD33G | 55,58 = BYD33G |
| 30 = BF 421 | |
| 34 = BZX79B22V | 62 = 1N4148 |
| 49 = BC 327 | |
| 50 = 1N4148 | |
| Inductances: | |
| 6 = 1.3 mH | 57 = 2 mH |
| line transformer = AT2077/80 (Philips) | |

This circuit is so simple that it can be economically realised using discrete components.

It will be obvious that several variations are possible without departing from the scope of the invention. For example, the sequence in which the three series-arranged basic components of the switched-mode power supply (17, 6, 15) are connected, may be changed. The deflection coil 14 might be connected to the primary winding, which would simplify the east/west correction, but its insulation must then be reinforced. Moreover, the isolation transformer 9 may be replaced by an opto-electronic coupler. As the latter cannot transfer enough power to drive the base of transistor 13, a drive stage such as, for example, the stage proposed at 8, FIG. 1, must then be provided. Transistor 42 may then, for example, be positioned between the coupler and transistor 13, that is to say in the non-insulated portion of the assembly. The choice between the solution using a transformer and the solution using a coupler depends on the cost price of the totality of the relevant components.

List of reference numerals of FIG. 1

1—power stage for the line deflection
2—line transformer
3—line oscillator
4—stand-by device
5—switching device of the switched-mode power supply
6—storage inductor of the switched-mode power supply
7—user circuits
8—drive circuit for transistor 13
9—d.c. insulating element inserted in the drive circuit of transistor 13
10—comparator device
11—device for reducing the rate at which the voltage at its terminals increases
12—control circuit for the switching device
13—line deflection switching transistor
14—line deflection coil
15—switching transistor of the switched-mode power supply
16—flyback diode of the switched-mode power supply
17—second storage capacitor
18—positive terminal of the power supply and of the mains rectifier section 21
19—negative terminal of the power supply
20—primary winding of the line transformer
21—rectifier device for the mains voltage
22—mains voltage, a.c.
23—negative terminal of rectifier 21
24—circuit for synchronizing the switched mode on the basis of the line deflection
25—audio power stage
26—immaterial line indicating the d.c. isolation from mains 22
27—first storage capacitor
28—connection and d.c. insulating capacitor for the synchronization.

What is claimed is:

1. A television receiver provided with a stand-by device, comprising a switched-mode power supply with a storage inductor and a switching device for supplying first user circuits, a power stage for the line deflection, having a switching element and a line transformer which is supplied by the switched-mode power supply, second user circuits being supplied via secondary windings of the line transformer, the stand-by state being obtained by stopping the line deflection, characterized in that the stand-by device is also supplied by the switched-mode power supply, the latter including self-oscillating and regulating means to ensure that when the line deflection is stopped the switched-mode power supply continues to supply the same voltage to the stand-by device.

2. A receiver as claimed in claim 1, characterized in that the storage inductor is provided with at least one secondary winding for supplying the stand-by device.

3. A receiver as claimed in claim 2, characterized in that a line oscillator is also supplied from a secondary winding of the storage inductor.

4. A receiver as claimed in claim 1, characterized in that the control of the switching device and the voltage regulation provided by the switched-mode power supply are together ensured by a comparator which drives a control circuit of the switching device in such manner as to trigger its conduction when said voltage is less than a reference value and to stop this conduction in the opposite case.

5. A receiver as claimed in claim 1, characterized in that it includes means for ensuring that the switched-mode power supply changes from a self-oscillating mode in the stand-by state to a mode in which it is synchronized by the line deflection when it is no longer in the stand-by state.

6. A receiver as claimed in claim 1, characterized in that a line deflection coil is connected to a secondary winding of the line transformer.

7. A receiver as claimed in claim 1, characterized in that it includes a capacitive delay device for delaying the increase of the voltage applied to the switching device, this delay device comprising a diode arrangement for rectifying a voltage, the voltage obtained being applied as a supply voltage to the control circuit of the switching device.

8. A receiver as claimed in claim 3, characterized in that the first user circuits comprise an audio power stage also supplied from a secondary winding of the storage inductor.

* * * * *